July 14, 1925.
C. UHL
1,546,329
PUMP WORKING BARREL
Filed Sept. 12, 1923
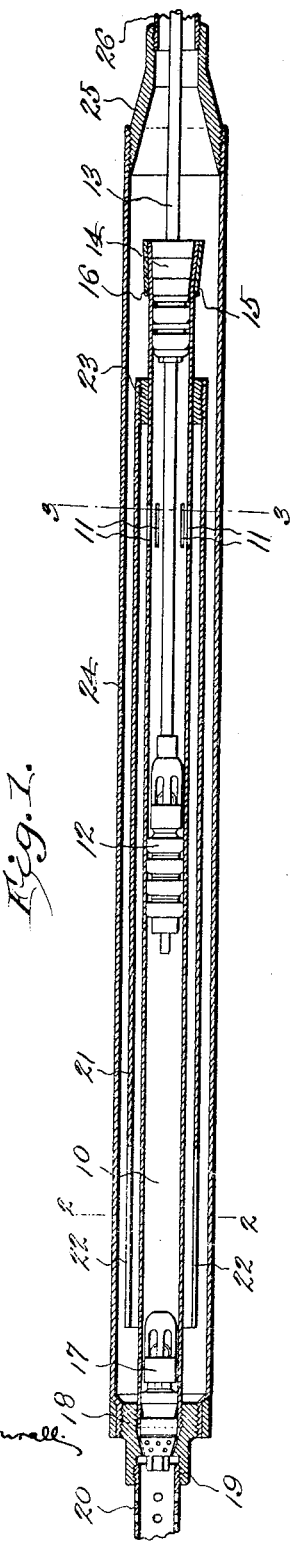
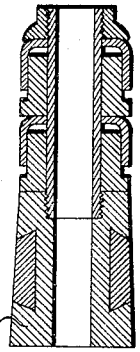
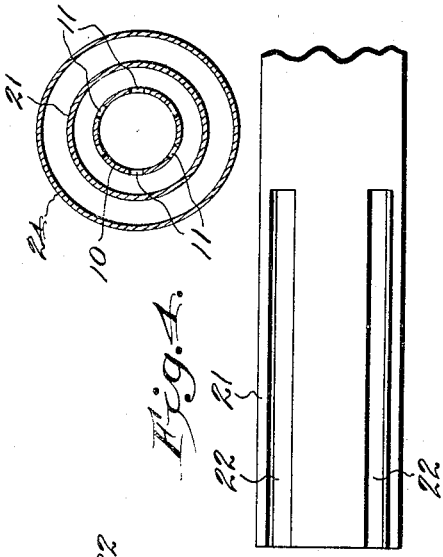
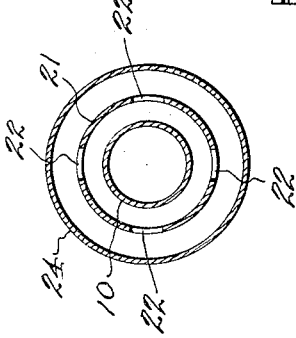
C. Uhl,
INVENTOR
BY Victor J. Evans
ATTORNEY
WITNESSES Patented July 14, 1925.

1,546,329

UNITED STATES PATENT OFFICE.

CLYDE UHL, OF BARTLESVILLE, OKLAHOMA.

PUMP WORKING BARREL.

Application filed September 12, 1923. Serial No. 662,311.

*To all whom it may concern:*

Be it known that I, CLYDE UHL, a citizen of the United States, residing at Bartlesville, in the county of Washington and State of Oklahoma, have invented new and useful Improvements in Pump Working Barrels, of which the following is a specification.

This invention relates to pumping apparatus and has for its object the provision of an improved working barrel for use particularly in oil fields for pumping oil, water, slush, sandy and muddy water without injury to the valve cups thereby eliminating the necessity for frequent pulling of the rod and tubing experienced with the common working barrel.

An important object is the provision of a device of this character which will be simple and inexpensive in manufacture, highly efficient in use, durable in service and a general improvement in the art.

With the above and other objects and advantages in view the invention consists in the details of construction to be hereinafter more fully described and claimed and illustrated in the accompanying drawings, in which:

Figure 1 is a longitudinal section through the complete device,

Figure 2 is an enlarged view of one end thereof.

The remaining figures are detail cross sections.

Referring more particularly to the drawings the numeral 10 designates an ordinary cast iron or steel working barrel which is provided at a point spaced from one end with a series of longitudinal slots 11. Within this barrel operates the traveling barrel 12 carried by a rod 13 which slides through a wedge plug 14 engaged within the slightly flaring end 15 of the barrel 10. This flared end is reinforced by a band 16 as shown. Within the other end of the barrel is the standing valve 17. This end of the barrel is screwed into the supporting casting 18 of the standing valve, and this casting has a threaded flange 19 within which is screwed the perforated anchor 20.

Surrounding and spaced from the barrel 10 is the baffle shell 21 which has one end terminating adjacent the standing valve provided with slots 22. Within the other end of this baffle shell is a collar 23 which fits snugly upon the barrel 10.

Surrounding this baffle shell is the outer shell 24 which has one end screwed onto the casting 18 and which has its other end internally threaded for the reception of a swedge 25 within which is screwed the tubing 26.

In the operation it is of course to be noted that the device works in substantially the same manner as other and well known devices for the same purpose, except that the present device possesses many advantages inasmuch as it prevents sand from settling on the traveling valve during the period of rest and prevents sand and other objectionable material from gaining access to the cups and cutting the same.

From the foregoing description and a study of the drawings it will be apparent that I have thus provided a simply constructed and inexpensive device which will be highly efficient for the purpose specified and which on account of the fewness of the parts should have a long life.

While I have shown and described the preferred embodiment of the invention it is of course to be understood that I reserve the right to make such changes in the form, construction and arrangement of parts as will not depart from the spirit of the invention or the scope of the subjoined claim.

Having thus described my invention I claim:

A device of the character described comprising a working barrel, a body secured exteriorly upon one end thereof, an anchor carried by said body, a standing valve secured within the body and extending into the barrel in communication with the anchor, a baffle shell surrounding the barrel and having its end toward said body terminating short thereof and slotted and having its other end equipped with a collar engaging upon said barrel, said barrel being formed with slots below said collar establishing communication between its interior and the space between it and the shell, an outer shell screwed upon said body, a swedge at the other end of said shell, tubing connected with said swedge, a working barrel within the barrel, a rod extending through said tubing and carrying said last named working barrel, and a swedge on the upper end of the barrel through which said rod slides.

In testimony whereof I affix my signature.

CLYDE UHL.